US012754619B1

(12) United States Patent
Banik et al.

(10) Patent No.: US 12,754,619 B1
(45) Date of Patent: Oct. 6, 2026

(54) DYNAMIC CODE RESEQUENCING FOR EXTERNAL INPUT

(71) Applicant: GOOGLE LLC, Mountain View, CA (US)

(72) Inventors: Subrata Banik, Bangalore (IN); Boris Mittelberg, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/213,630

(22) Filed: May 20, 2025

(51) Int. Cl.
*G06F 3/023* (2006.01)
*G06F 3/02* (2006.01)

(52) U.S. Cl.
CPC .......... *G06F 3/0233* (2013.01); *G06F 3/0219* (2013.01)

(58) Field of Classification Search
CPC ... G03F 3/00; G03F 3/002; G03F 3/02; G03F 3/019; G03F 3/0227; G03F 3/023; G03F 3/0231; G03F 3/0233; G03F 3/03
See application file for complete search history.

(56) References Cited

U.S. PATENT DOCUMENTS 11,422,600 B2 * 8/2022 Sultenfuss ............ H02J 7/0063
2003/0201981 A1 10/2003 Nathan
2004/0036632 A1 2/2004 Ford
2013/0275632 A1 10/2013 Meng et al.
2022/0179501 A1 * 6/2022 Chuang .................. H03M 11/04

FOREIGN PATENT DOCUMENTS

CN 102650907 A * 8/2012 ............... G06F 3/02

OTHER PUBLICATIONS

"Use Siri on All Your Apple Devices", Apple; https://support.apple.com/en-in/105020, Apr. 1, 2024, 5 pages.
"User Manual—KB950", Kinesis Gaming; https://gaming.kinesis-ergo.com/wp-content/uploads/2017/09/Edge-Manual-Sept-20.pdf, Sep. 20, 2017, 19 pages.

* cited by examiner

*Primary Examiner* — Franklin D Balseca
(74) *Attorney, Agent, or Firm* — Brake Hughes Bellermann LLP

(57) ABSTRACT

Disclosed implementations for remapping input received from an input device. In an example implementation, a connection with an external input device is detected via an embedded controller communicably coupled to an electronic processor. An association between a first input of the external input device and a second input of an internal input device is retrieved from the embedded controller via firmware executed by the electronic processor. The first input from the external input device is received via a driver executed by the electronic processor. In response to receiving the first input from the external input device, a value associated with the second input is determined via the driver. The value is provided to an operating system.

20 Claims, 8 Drawing Sheets

280

| SIGNAL1 | SINGNAL2 | OVERRIDE |
|---|---|---|
| 0 | 0 | X |
| 0 | 1 | X |
| 1 | 0 | X |
| 1 | 1 | Active |

DYNAMIC CODE RESEQUENCING FOR EXTERNAL INPUT

BACKGROUND

Human interface devices (HIDs), such as keyboards, mice, joysticks, and touchscreens, are input devices that allow humans to interact with computers facilitating both data input and control.

SUMMARY

HIDs that are on-board a device (also referred to herein as an internal input device), such as a laptop keyboard, may be configured to tie a particular input or a set of inputs, such as a shortcut keys, to tasks that are hard to perform and/or repetitive, such as adjusting the screen brightness or sound volume. At least one technical problem with this approach is that the reliance on the on-board HID and dedicated input keys is wasteful of hardware resources, especially when a user primarily uses an external HID (e.g., a wireless keyboard instead of using the on-board keyboard). This approach also creates a significant usability barrier when external HIDS, such as docking stations or monitors with integrated keyboards, are employed.

The implementations described herein provide at least one technical solution to these technical problems by remapping input, when received from an external HID (e.g., a keyboard), via an operating-system agnostic, hardware driven method. The method employs an embedded controller, which is a microcontroller of a computer dedicated to handling an operating-system task(s), configured to provide an interrupt to load the mapping based on an override condition. In one example implementation, a connection with the external HID is detected via the hardware controller. An association (e.g., a mapping) between a first input of the external HID and a second input of an internal HID is retrieved from the hardware controller. In response to receiving the first input from the external input device, the method includes providing a value associated with the second input to an operating system based on the association. Thus, the embedded controller enables a user to take advantage of the functionality of a shortcut key on the on-board HID using an external HID.

It is appreciated that methods in accordance with the present disclosure can include any combination of the aspects and features described herein. That is, methods in accordance with the present disclosure are not limited to the combinations of aspects and features specifically described herein but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

The following detailed description that sets forth aspects of the subject matter, along with the accompanying drawings of which.

DETAILED DESCRIPTION

Over the years, computer manufacturers (also referred to as original computer manufacturers (OEMs)) have provided product-level distinction using on-board HIDs, primarily via an on-board keyboard, configured to allow users to perform tasks that are hard to perform, tricky, or repetitive, via a reduced set of inputs (i.e., one or more inputs configured to perform a particular task). For example, a dedicated key(s) strategically located on the on-board keyboard (e.g., in the first row) configured to increase screen brightness in addition to the controls for changing the brightness provided via the operating system.

Figure 1:
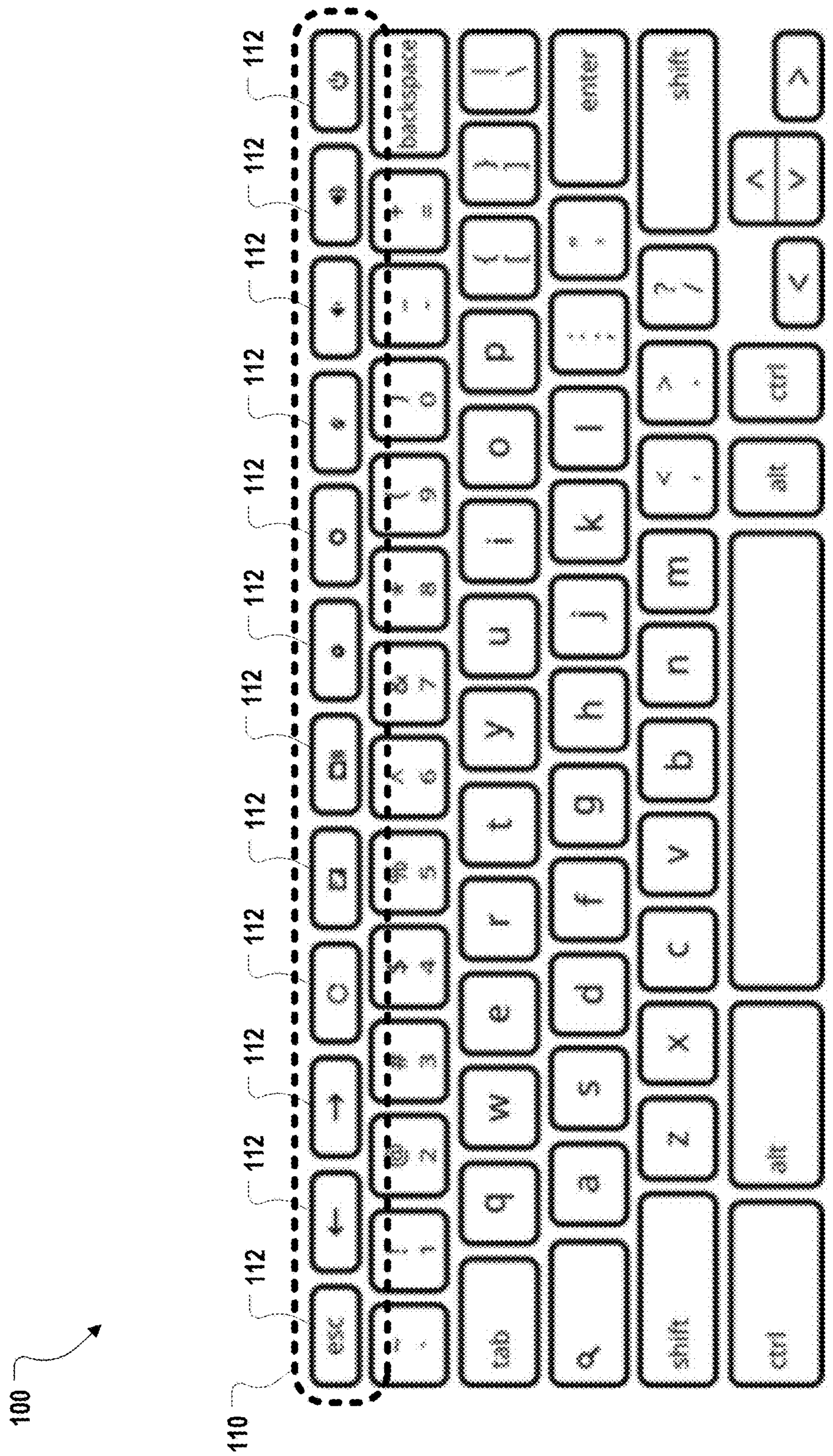
FIG. 1 is an example on-board keyboard layout having a first row that includes special purpose keys.

FIG. 1 shows an example on-board keyboard layout 100 having a first row 110 that includes special purpose keys 112. These special purpose keys 112 are each tied to a special operation or function that requires additional mapping as part of the software logic. For example, pressing a brightness control adjusts the luminance of the display. Tying each of these special purpose keys 112 to a particular operation requires the additional development, testing and validation. Moreover, OEMs create product differentiation via special product flow that is designed around functionality provided via the special purpose keys 112 (and/or other inputs provided by HIDs) combinations. For example, the simultaneously pressing ESC & REFRESH & POWER BUTTON as a key combination may be configured to initiate recovery boot.

At least one technical problem with this approach is that the reliance on an on-board keyboard and dedicated keys is wasteful of resources, especially when a user primarily uses an external keyboard instead of the on-board keyboard. This approach also creates a significant usability barrier when external input devices, such as docking stations or monitors with integrated keyboards, are employed. The moment a user attaches to an external keyboard and displays, with or without attaching the docking station, the on-board keyboard becomes a wasteful hardware resource. In many cases, the on-board keyboard is not powered off while the user switches to the external display and keyboard yet the user no longer has the ability to leverage the on-board keyboard. The lack of support for the mapping of these specific key combinations to external keyboards poses a challenge for users who prefer to work with external input devices.

Moreover, users' inability to employ shortcut keys when using an external input device presents a significant inconvenience. For example, gaming laptops may include specialized shortcut keys that enable functionality such as on-demand processor cooling. In many cases, such functionality cannot be initiated through software configuration alone and often requires special hardware handling. Accordingly, the systems and methods described herein provide a flexible and inclusive approach that elevates the overall user experience and enhances usability for users who prefer external keyboards. Additionally, some current implementations may allow overriding the on-board keyboard keys while using an external keyboard, however, this process is manual and does not scale.

Accordingly, the implementations described herein provide at least one technical solution to these technical problems by remapping input (e.g., the special keys on an on-board keyboard) via an operating-system agnostic, hardware driven method that employs a standalone hardware controller (also referred to herein as an embedded controller) when an external HID (e.g., a keyboard) is detected. The system enhances usability by maintaining seamless access to special device functions (e.g., boot modes, recovery, and the like that are tied to a specific key on an on-board keyboard) when using external input devices. The system also reduces electronic waste when, for example, an on-board display is broken or faulty as typically, in such cases, the entire device would need to be replaced. Additionally, the system provides for the introduction of new features where, for example, OEMs may leverage Generative AI to launch a bot or agent, starting a search, and so forth by pressing a dedicated key mapped to functionality provided via the on-board HID.

In some implementations, the embedded controller is a standalone hardware block that is independent of the main processor and operating system and configured to manage keyboard layout, power sequencing, and other functions as well as detect the presence of external devices (e.g., docking station, external keyboards, monitors, and the like) and dynamically remap special keys on certain external input devices (e.g., the first row and/or first column of a keyboard) to emulate the special key sequences used by the computing device.

In some implementations, the embedded controller executes a wrapper block, e.g., as part of the firmware and/or a real-time operating system (RTOS). In some implementations, the embedded controller provides an application programming interface (API) for the upper layer, such as the operating system, drivers, and the like, to understand a mapping between an on-board keyboard (or any on-board or default input device) and a keyboard (or other input device) externally connected via an interface, such as a port or socket.

In some implementations, the wrapper block resides in the EC firmware to customize key mapping based on the on-board keyboard layout design without affecting other layers in the stack. In some implementations, upon detection of an external device, a mapper daemon establishes the virtual mappings between the actual external keyboard keys and the on-board keyboard's special key sequences, which are recognized by the device by default (e.g., programmatically linked via the original equipment manufacturer).

Figure 2:
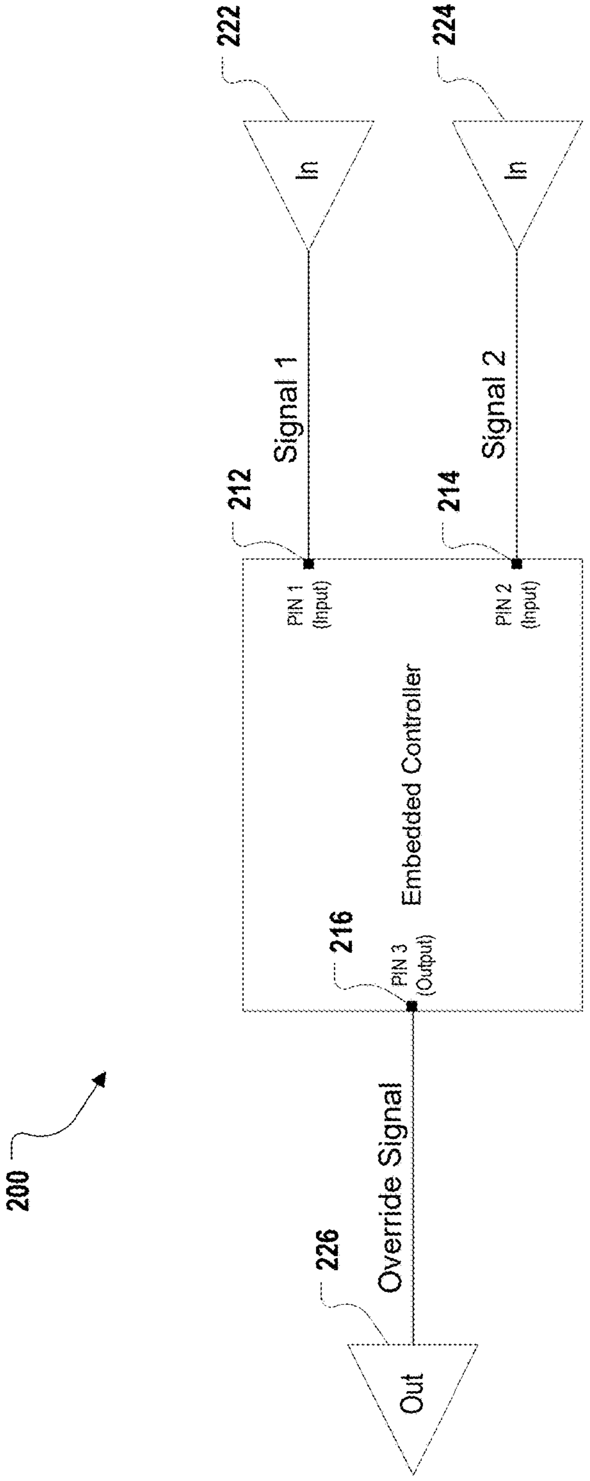
FIG. 2 is an example embedded controller that can be employed to execute example implementations of the present disclosure.

FIG. 2 shows an example embedded controller 200. The embedded controller 200 is an independent hardware controller (e.g., separate from the system-on-a-chip (SoC)) that is configured to detect connection of an external HID and remap input (e.g., keystrokes) from the HID to one of a set of inputs configured to perform a particular task or a feature to enable triggering of these tasks and features via the external HID. As depicted, the embedded controller 200 includes a number of general-purpose input/output (GPIO) pins 212, 214, 216 that are used to communicate with the host's SoC and processor. Three pins, two configured to receive an input signal and one configured to provide an output signal, are shown in FIG. 2 for simplicity; however, it is contemplated that implementations of the present disclosure can be realized with any configuration and number of pins configured to receive or provide at least one signal. In some implementations, the embedded controller 200 is configured as a thread-based implementation that samples the input signals received via pins 212 and 214.

In the depicted implementation, pin 212 is configured to receive input signal 222 and functions as a GPIO input to the embedded controller 200 from the SoC, see the description of FIGS. 3A and 3B below for the description of an example SoC. In the example implementation, pin 212 is configured to monitor a connection to an external device, such as an HID device or a docking station, and/or an open or close status of the computing device lid (i.e., whether the laptop lid is in an open position or a closed position). A CONNECTED_DEVICE or a LID_OPEN pin state (or a combination of both) may be determined by various factors and logics. For instance, the SoC drives the input signal 222 low to assert the pin 212, resulting in a change from zero to one, when the lid is closed and/or when a device is connected via the USB port.

In the depicted implementation, pin 214 is configured to monitor a status of the host device. For example, when the host device is powered on, the system power management controller of the SoC drives the input signal 224 high to indicate that the system is in an "on" state. In some cases, when the host device transitions from a working state ("S0") to a lower power mode such as standby ("S3") or shutdown ("S5"), the pin 214 is deasserted (i.e., the SoC drives the input signal 224 low). Sampling these input signals at the embedded controller 200 allows the system to determine whether the host is in an "On" or "Off" state.

In some implementations, multiple signals may be combined to assert/deassert input pins, such as input pins 212 and 214 (see the description of FIGS. 3A and 3B below). For example, the SoC may be configured to drive the input signal 222 high to assert the pin 212 when the lid is closed and/or when connected to an external device (e.g., connecting the host device to a docking station or an external keyboard via a universal serial bus (USB) port).

In the depicted implementation and as shown in Table 280, pin 216 is configured to provide the override signal 226 as output toward the SoC. In some cases, the override signal 226 notifies the upper-level software whether the remapping function should be initiated. In the depicted implementation, the embedded controller 200 asserts the override signal 226, via pin 216, based on the states of pins 212 and 214. Specifically, when the host device is on (i.e., the input signal 224 is high) and the device is connected to a docking station or external HID with the lid closed (i.e., the input signal 222 is high), the embedded controller 200 asserts the override signal 226 to high.

In some implementations, a wrapper block is executed by the embedded controller 200 as part of the firmware/RTOS and provides an API for the upper layers, such as the operating system, drivers, and advanced configuration and power interface (ACPI)—basic input/output system (BIOS), to understand the actual mapping between the on-board HID (e.g., keyboard) and the external device. In some implementations, the wrapper block resides in firmware on the embedded controller 200 to customize key mapping based on the OEM device layout design without affecting other layers in the stack.

Figure 3A:
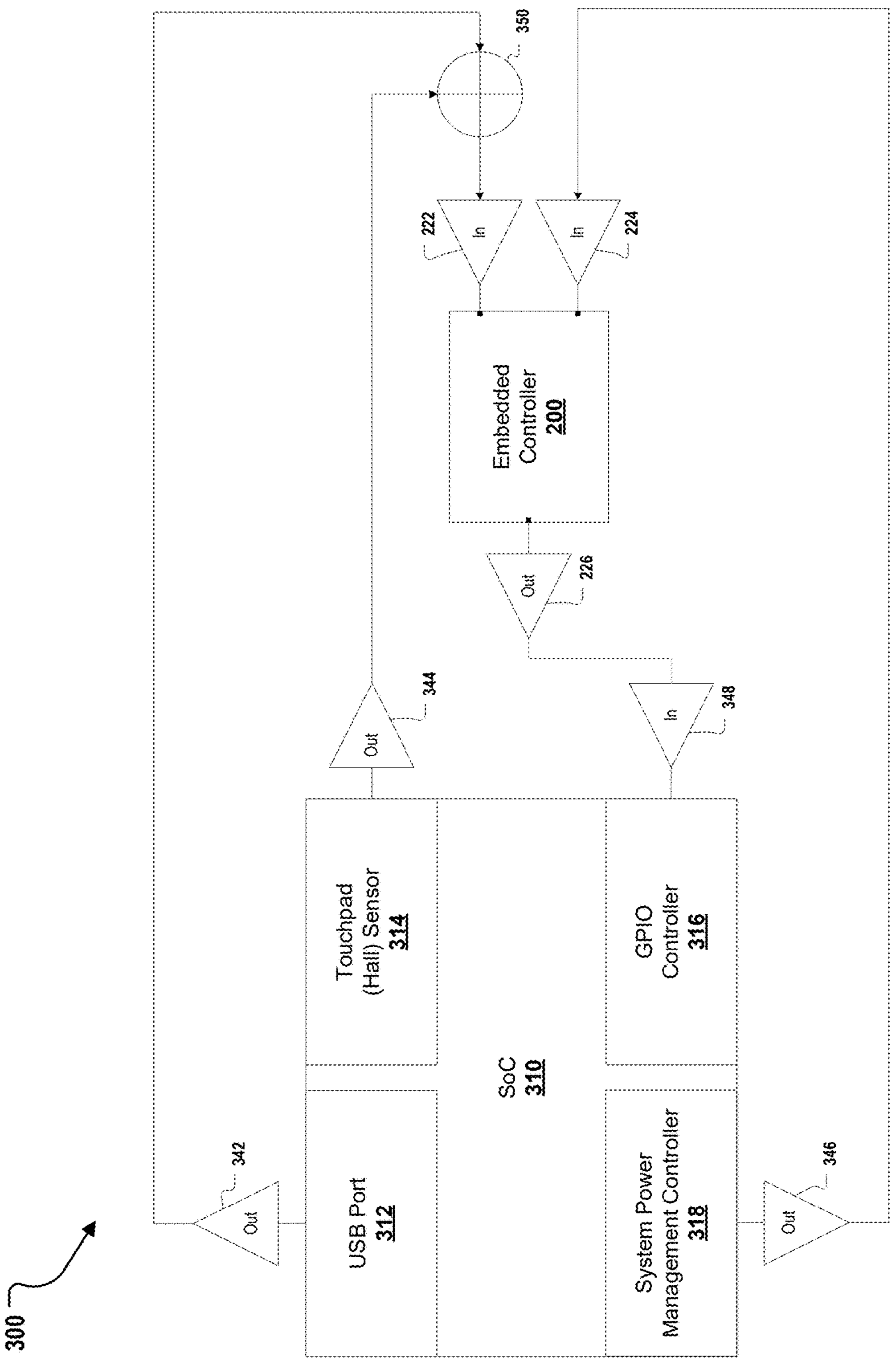
FIGS. 3A and 3B are example host devices configured to remap input using a remapping table provided via the embedded controller of FIG. 2.
Figure 3B:
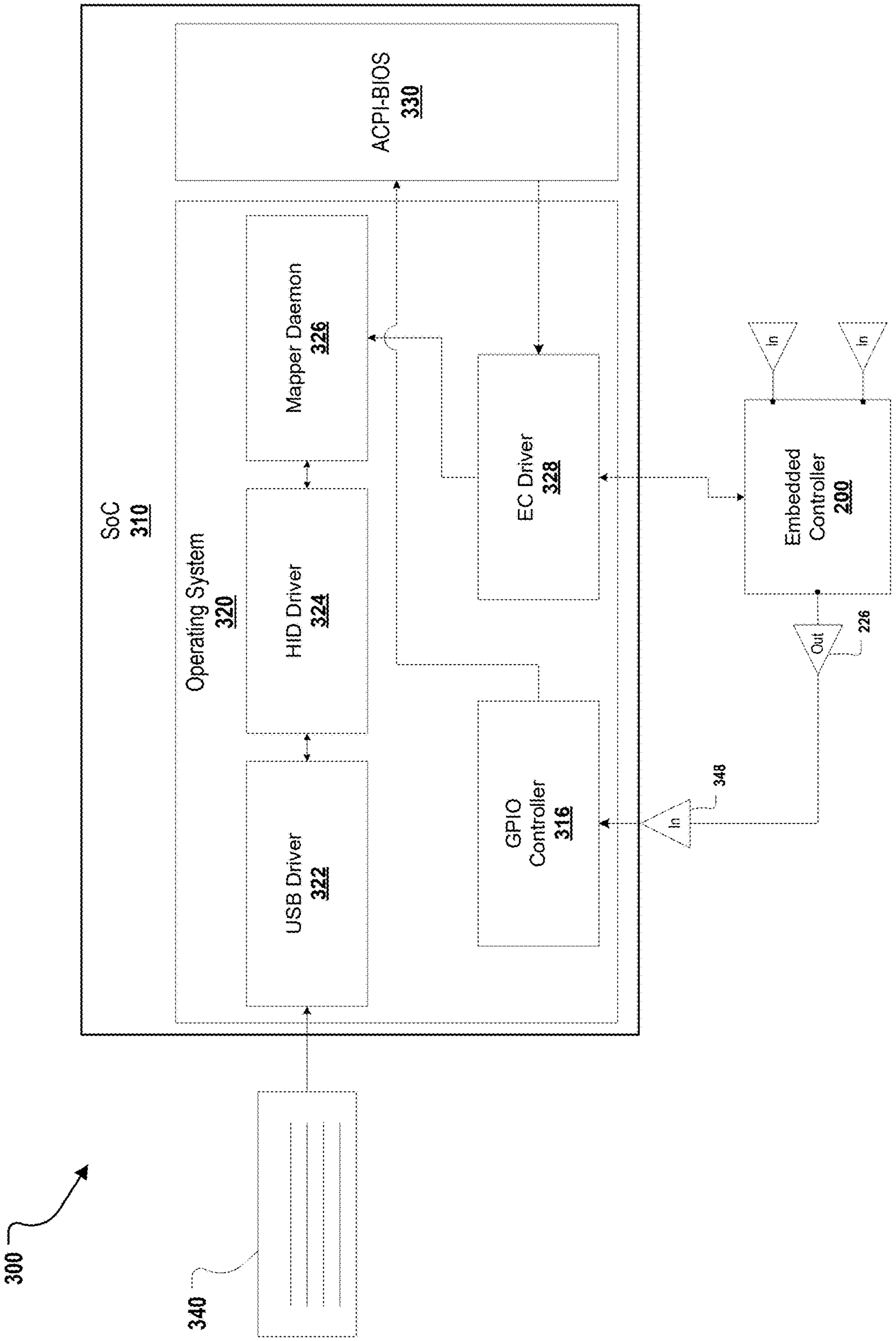

FIGS. 3A and 3B show elements of an example host device 300 configured to remapping input using a remapping table (also referred to herein as an association table) provided via the embedded controller 200 when an external HID (e.g., a keyboard) is detected. As described above, the host device 300 may be implemented in any user device that includes an on-board or default HID. Example host devices include, but are not limited to, desktop computers, laptop computers, printers, and server devices as well as mobile devices such as tablets, smartphones, smart watches, e-readers, and handheld gaming consoles.

The description below describes the system in the context of mapping a set of keys of an on-board keyboard (e.g., the first row 110 of the keyboard layout 100 described above with reference to FIG. 1) to a remote keyboard when connected; however, implementations may be employed with any type of HID, on-board or having a default configuration when connected to the host device 300, when the same or similar type remote HID is connected to the host device 300 to map a set of dedicated functions, which are tied to specific inputs, from the on-board/default device to the remote device using a remapping table stored to the embedded controller 200. For example, a gaming console may include an on-board controller where particular inputs and/or input combinations are each mapped to a function. In such an example, the described system may be used to map these combinations and functions to an external controller when connected. Other examples include mapping dedicated functions from an on-board mouse, touch screen, trackpad, joysticks, gamepad, scanner, readers, microphone, camera, and the like to an external device when connected.

As depicted, the host device 300 includes the embedded controller 200 and a SoC 310. In some cases, the SoC 310 includes a microchip that integrates the electronic components for the host device 300, such as an electronic processor (CPU, GPU), memory (RAM, ROM), input/output ports and other components, onto a single integrated circuit. By integrating components on a single chip, the SoC 310 provides faster communication and processing speeds while also reducing inter-chip communication and integration of components and lowering power consumption. The components of the SoC 310 are described in greater detail below in the description of FIG. 6.

Components of the SoC 310 depicted in FIG. 3A include a USB port 312, a touchpad sensor 314, GPIO controller 316, and system power management controller 318. These components may be implemented in hardware, software (e.g., via firmware and/or integrated with the operating system and/or BIOS), or a combination of both. The USB port 312 provides a standard interface for connecting devices such as computers, smartphones, and peripherals, enabling data transfer and power delivery. The touchpad sensor 314 is configured to detect when the lid (i.e., the display lid) is closed.

In some implementations, the touchpad sensor 314 is located in the palm rest or lid. In some implementations, the touchpad sensor 314 is a hall effect sensor (also referred to as a hall sensor). In such implementations, when the display lid is closed, a magnet embedded in the lid engages the hall effect sensor signaling that the host system is closed, which triggers sleep or hibernation mode to conserve power. In some implementations, the GPIO controller 316 provides for communication between the embedded controller 200 and the components of and programs (e.g., the operating system and drivers) executed by the SoC 310 by configuring pins, such as pins 212, 214, and 216, as either inputs or outputs to enable tasks.

In some implementations, the system power management controller 318 manages the power distribution and consumption within the host device 300 by optimizing energy usage and ensuring efficient operation. In some cases, the system power management controller 318 dynamically adjusts power levels to meet the demands of different components, often including features for power sequencing, voltage monitoring, and fault reporting.

As depicted in FIG. 3A, the USB port 312 and the touchpad sensor 314 are configured to provide output signals 342 and 344 respectively, while the system power management controller 318 is configured to provide output signal 346. Output signals 342 and 344 are combined, via combiner 350, and provided as input signal 222 to the embedded controller 200. Output signal 346 is provided as input signal 224 to the embedded controller 200.

In an example scenario, the output signal 342 is asserted high (e.g., via the USB port 312 or another component of the SoC 310) when a device, such as a docking station or external HID, is connected to the host device 300 via the USB port 312. In some cases, the output signal 342 is asserted high only when a particular type of device, such as a docking station or external HID, is connected to the host device 300 via the USB port 312 and asserted low when a device connected via the USB port 312 is not the particular type or when no device is connected via the USB port 312.

Continuing with the example scenario, the output signal 344 is asserted high (e.g., via the touchpad sensor 314 or another component of the SoC 310) when the display lid is closed and asserted low when the display lid is open. The combiner 350 is configured to combine the output signals 342 and 344 into input signal 222, which is provided as input to the embedded controller. For example, in the scenario described above, the output signals 342 and 344 may be implemented as a simple logical circuit and configured to AND the signals to form input signal 222. However, other implementations are contemplated where one or both of the signals are reversed and combined according to the specific implementation.

As described above with reference to FIG. 2, the embedded controller 200 is configured to provide override signal 226 based on the input signals 222 and 224. As depicted in FIG. 3A, the override signal 226 is provided as input signal 348 to the GPIO controller 316. In some implementations, the override signal 226 is asserted to notify the SoC 310 to the override input signals received via an external HID (e.g., a keyboard) according to a remapping table, which, in some cases, is stored on the embedded controller 200.

Continuing with the example scenario, the output signal 346 is asserted high (e.g., via the system power management controller 318 or another component of the SoC 310) when the host device 300 is powered on. Accordingly, the embedded controller 200 is configured to provide the override signal to the SoC 310 when the lid is closed and the host device 300 is connected to an external device, e.g., a docking station or external HID, via the USB port 312 (i.e., input signal 222 is asserted high) and when the host system is powered on (i.e., input signal 224 is asserted high). The example scenario described is merely one example of how the SoC 310 and embedded controller 200 can be configured to assert the override signal 226. It is contemplated that the embedded controller may be configured to assert the override signal 226 based on a number of combinations of signals according to the particular use case implemented. For example, the embedded controller 200 may provide the override signal based on a signal input (e.g., the device is powered on).

FIG. 3B depicts the components of the host device 300 that may be employed once the embedded controller 200 asserts the override signal 226, which is provided as input signal 348 to the GPIO controller 316. As depicted in FIG. 3B, the SoC 310 is configured to provide the operating system 320 and ACPI-BIOS 330 for the host device 300. The operating system 320 is initialized by booting on the SoC 310 via a sequence of steps to initialize the SoC and load the operating system kernel into memory. For example, the SoC may begin execution from a predefined boot address, typically in on-chip ROM (BootROM), which then initializes hardware components of the SoC 310 and loads the operating system 320 (and applicable application code) into memory, allowing the SoC to function. Generally, the operating system 320 is the program that, after being initially loaded, manages the other application programs provided via the host device 300. These application programs make use of the operating system 320 by making requests for services through a defined API. Generally, the ACPI-BIOS 330 is a firmware that provides a standardized interface for the operating system 320 to manage hardware configuration and power management, enabling features like sleep modes and efficient power usage.

As depicted in FIG. 3B, the operating system 320 includes a USB driver 322, an HID driver 324, a mapper daemon 326, an EC driver 328, and the GPIO controller 316. In some implementations, the USB driver 322 includes a software component executed via the kernel that allows the operating system 320 to communicate with and control a USB device, such as the external HID device 340. Generally, the USB driver 322 acts as a translator, enabling the operating system 320 to understand commands and data provided by the USB device as well as provide information to the USB device.

In some implementations, the HID driver 324 includes a software component executed via the kernel that enables the operating system 320 to communicate with and interpret input from an HID device. Generally, the HID driver 324 functions in conjunction with the USB driver 322 to facilitate communication between the operating system 320 and an external HID device, such as the external HID device 340, when connected to the host device 300 via a USB port. In some implementations, the HID driver 324 is configured to handle specific data format and protocol for the HID, while the USB driver 322 manages the underlying USB bus communication. For example, when the external HID device 340 is a keyboard, the HID driver 324 is generally accountable for the mapping between the inputs received via the physical keys of the keyboard (or virtual keys when executed within a virtual environment) and a scan code.

Similar to the USB driver 322 and HID driver 324, the EC driver 328 includes a software component executed via the kernel that enables the operating system 320 to communicate with and interpret input from the embedded controller 200.

In some implementations, the mapper daemon 326 includes a software component configured to fetch the remapping table from memory (once provided by the embedded controller 200). When active, the mapper daemon 326 may be executed as a background process of the operating system 320 to act as an indicator to the HID driver 324 that a remapping layer should be used to remap external inputs received from the external HID device 340 into inputs provided via the on-board HID (e.g., key inputs from an external keyboard are translated to the on-board keyboard scan codes based on the remapping table). In some implementations, execution of the mapper daemon 326 is controllable by the user, allowing the user to stop and restart the process as needed. For example, the user may stop the mapper daemon 326 once initiated based on receiving output signal 346 or may configure the host device 300 to prompt the user when the output signal 346 is received.

Example Processes

Figure 4A:
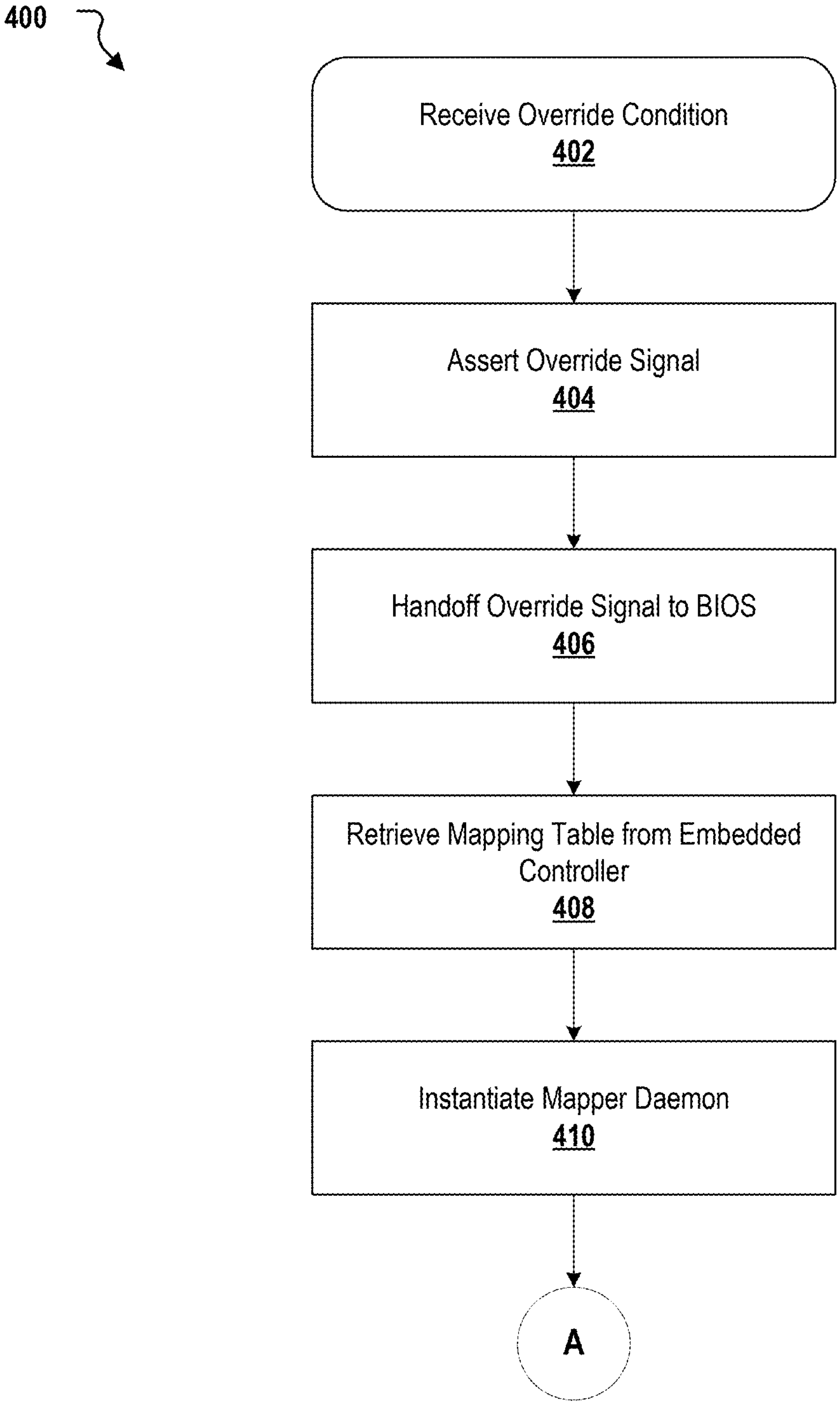
FIGS. 4A and 4B illustrate a flowchart of a non-limiting process that can be performed by example implementations of the present disclosure.
Figure 4B:
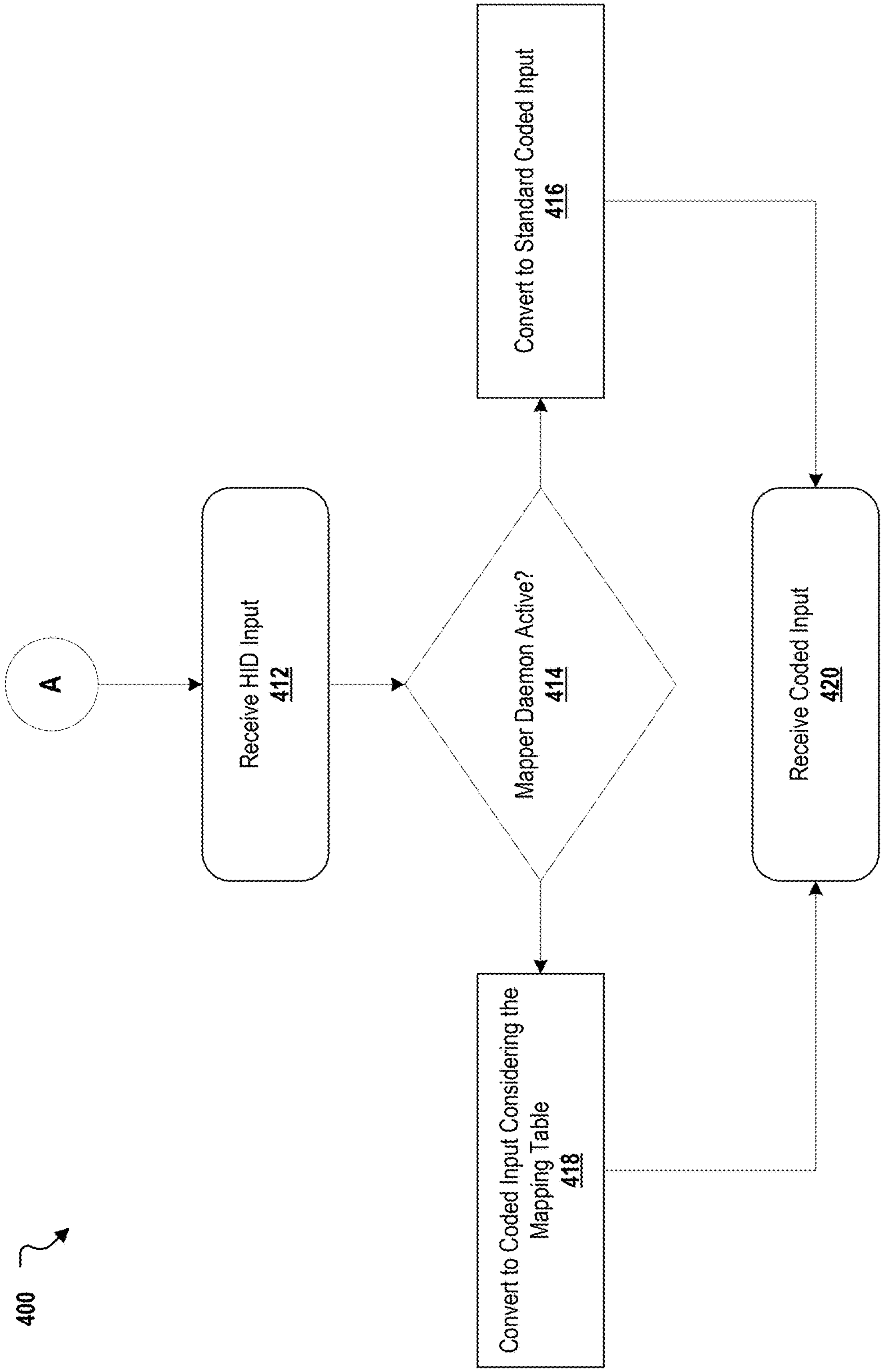

FIGS. 4A and 4B depict a flowchart of an example process 400 that can be implemented by implementations of the present disclosure. The example process 400 can be implemented by systems and components described with reference to FIGS. 1, 2, 3A, 3B, and 6. The example process 400 generally shows in more detail a set of functions provided via an on-board HID device, such as a keyboard, are dynamically remapped to a connected, external HID device through the embedded controller 200.

For clarity of presentation, the description that follows generally describes the example process 400 in the context of FIGS. 1, 2, 3A, 3B, and 6. However, it will be understood that the process 400 may be performed, for example, by any other suitable system, environment, software, and hardware, or a combination of systems, environments, software, and hardware as appropriate. In some implementations, various operations of the process 400 can be run in parallel, in combination, in loops, or in any order.

At 402, the embedded controller 200 receives the override conditions as configured for a specific use case. For example, in the scenario described above, the embedded controller 200 receives the output signal 342, from the USB port 312, and the output signal 344, from the touchpad sensor 314, as the combined input signal 222 and the output signal 346 from the system power management controller 318 as input signal 224. In this scenario, the override conditions are configured as when the output signal 342 indicates a connection of an external device, such as a docking station or the external HID device 340, to the host device 300 via the USB port 312; the output signal 344 indicates a closure of the host system's 300 lid; and that the host device 300 is powered on. As described above, these override conditions may vary according to the specific use case for which implementations of the described system are configured.

From 402, the process 400 proceeds to 404, where the embedded controller 200 is configured, via firmware, to assert (e.g., drive the signal active high) the override signal 226. In some implementations, the override signal 226 is a system control interrupt (SCI). Generally, an SCI is a type of Global System Interrupt (GSI) that is typically generated via hardware (e.g., generated by the embedded controller 200) and used to notify the operating system 320 of ACPI events, such as power management or system events (e.g., the override signal 226).

From 404, the process 400 proceeds to 406, where the operating system 320 receives the override signal 226, via the GPIO controller 316, as the input signal 348 to override inputs (e.g., keyboard scan codes) received from the connected HID according to a remapping table stored to the embedded controller 200.

From 406, the process 400 proceeds to 408, where the ACPI layer, which is part of the operating system power management (OSPM), asserts control and retrieves an ACPI-BIOS handler. The ACPI-BIOS 330 is configured to copy, via the ACPI-BIOS handler, the HID remapping table from a memory address shared between the embedded controller 200 and the ACPI-BIOS 330. To ensure latency savings, in some implementations, the embedded controller 200 firmware moves the keyboard the HID remapping table to the shared memory address based on a trigger (e.g., based on the override condition, when a user switches to an external display with an external keyboard, when the application processor issues an out of reset, and so forth). The ACPI-BIOS 330 then populates the HID remapping table (e.g., in the RAM) for use by the high-level (e.g., upper software) operating system.

In some cases, the remapping table differs based on a particular OEM's design. For instance, the keyboard layout and design for a first OEM may not be identical to that of a second OEM. Accordingly, the firmware of the embedded controller 200 stores this configuration information, as each OEM design has a unique embedded controller firmware binary and offers a generic response when receiving the host command from the SoC.

Table 1 below shows a sample remapping based on the keyboard layout shown in FIG. 1. As indicated above, the embedded controller 200 firmware copies the mapping data (e.g., the HID remapping table) to shared memory to avoid user latency.

TABLE 1

| Key Usage Index (dec) | Native on-board KBD Operation | Native Scan Code (Key Press/Key Release) (hex) | External KBD Operation | External KBD Scan Code (Key Press/Key Release) (hex) |
|---|---|---|---|---|
| 110 | Esc | e001/e081 | Esc | e001/e081 |
| T1 | Back | e06a/e0ea | F1 | e03b/e0bb |
| T2 | Forward | e06b/e0eb | F2 | e03c/e0bc |
| T3 | Refresh | e067/e0e7 | F3 | e03d/e0bd |
| T4 | Full Screen | e011/e091 | F4 | e03e/e0be |
| . . . | . . . | . . . | . . . | . . . |
| T12 | Lock | 2f/af | F12 | 58/d8 |

From 408, the process 400 proceeds to 410, where the mapper daemon 326 is instantiated by the operating system 320, which has access to the HID remapping table stored by the ACPI-BIOS 330 in step 408 (e.g., the memory location in the RAM). In some implementations, the operating system 320 fetches the HID remapping table using a Host command or using Memory share inter-process communication (IPC) techniques such as data full and please fetch the data.

From 410, the process 400 proceeds to 412, where the HID driver 324 receives an input (e.g., a key input) from the external HID device 340 via the USB driver 322.

From 412, the process 400 proceeds to decision 414 where the HID driver 324 determines whether the mapper daemon 326 is active. For example, the mapper daemon 326 may be toggled on and off by a user (e.g., via a control provided by the operating system 320).

When the mapper daemon 326 is inactive, the process 400 proceeds to 416 where the input is converted normally, i.e., without using the mapping table. For example, the inputs received from an external keyboard are converted to their standard scan codes.

When the mapper daemon 326 is active, the process 400 proceeds to 418 where the HID driver 324 converts the inputs based on the mapping table. For example, the inputs received from an external keyboard are remapped to the native scan codes matched in the remapping table. As an example scenario using Table 1 above, a user presses a physical key at the external keyboard (USB) location T3, which corresponds to F3 on the on-board keyboard according to the mapping table. The mapper daemon 326 service finds the corresponding native keyboard operation as "Refresh". Instead of passing the scan code for the F3 key ("e03d/e0bd", the mapper daemon 326 passes the scan code for "Refresh" (0xe067/0xe0e7) to the HID driver 324.

From 416 and 418, the process 400 proceeds 420, where the HID driver 324 provides the coded input to the operating system 320 (or current user application). The user application reads this coded input (e.g., scan code) and performs the operation (e.g., in the example scenario, the refresh operation).

Figure 5:
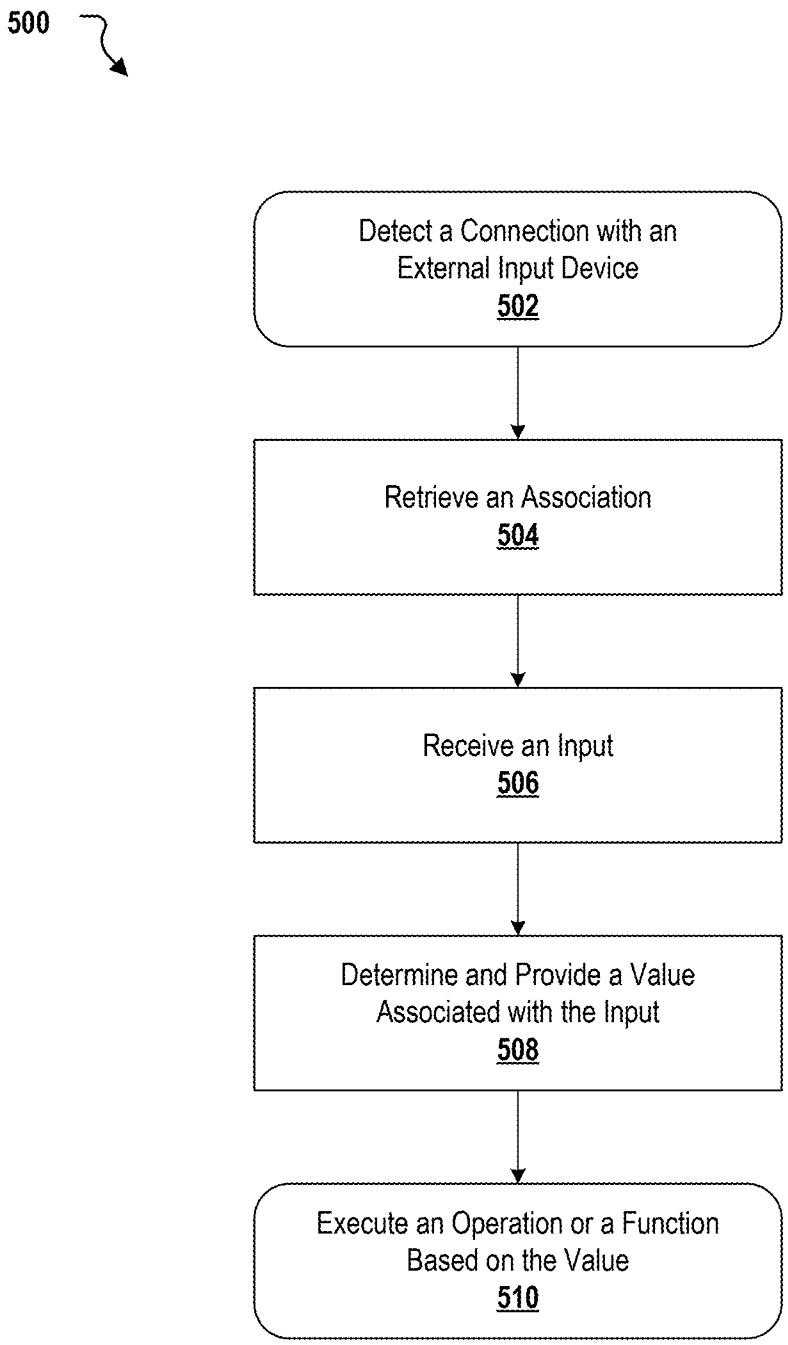
FIG. 5 illustrates a flowchart of another non-limiting process that can be performed by example implementations of the present disclosure.

FIG. 5 depicts a flowchart of an example process 500 that can be implemented by implementations of the present disclosure. The example process 500 can be implemented by systems and components described with reference to FIGS. 1, 2, 3A, 3B, and 6. The example process 500 generally shows in more detail providing, to an operating system, a value tied to a function based on receiving an external input device.

For clarity of presentation, the description that follows generally describes the example process 500 in the context of FIGS. 1, 2, 3A, 3B, and 6. However, it will be understood that the process 500 may be performed, for example, by any other suitable system, environment, software, and hardware, or a combination of systems, environments, software, and hardware as appropriate. In some implementations, various operations of the process 500 can be run in parallel, in combination, in loops, or in any order.

At 502, the embedded controller 200 detects a connection from an external input device (e.g., the external HID device 340). As described above, the embedded controller 200 can be configured to provide an override signal to the SoC 310 via the GPIO controller 316 when an override condition is met. In some implementations, the override condition is met when the embedded controller 200 detects the connection from the external input device. In some implementations, the embedded controller 200 detects the connection based on the output signal 342 provided by the USB Port 312 received as input signal 222. In some implementations, the override condition is met when both the connection with the external input device is detected and a display lid is detected in a closed position. In some implementations, the embedded controller 200 detects the closed position of the display lid based on the output signal 344 provided by touchpad sensor 314 received as input signal 222. As described above with reference to FIGS. 3A and 3B, the output signals 342 and 344 may be combined into input signal 222 to indicate the override condition (e.g., an external device is connected and the lid is in the closed position). In some implementations, the embedded controller 200 receives the input signal 222 via a communication protocol supporting asynchronous serial communication, such as universal asynchronous receiver-transmitter (UART), serial peripheral interface (SPI), inter-integrated circuit (I2C), and the like, and through a pin, such as pins 212 or 214, and provides the override signal via a pin, such as pin 216.

From 502, the process 500 proceeds to 504 where the ACPI-BIOS 330 retrieves the HUD remapping table from a memory address shared between the embedded controller 200 and the ACPI-BIOS 330. The HID remapping table provides an association between a first input of the external input device and a second input of an internal input device. In some cases, the association is included in an association table (e.g., the HID remapping table) that includes a plurality of associations between a plurality of inputs of the external input device and a plurality of inputs of the internal input device. In some cases, the plurality of inputs of the external input device includes the first input. In some cases, the plurality of inputs of the internal input device include the second input. The ACPI-BIOS 330 then populates the HID remapping table to a memory address (e.g., using volatile memory such as RAM) and instantiates a background process (e.g., the mapper daemon 326) which is permissioned with access to the memory address and configured to access the HUD remapping table.

From 504, the process 500 proceeds to 506 where the first input from the external input device is received via a driver (e.g., the HID driver 324).

From 506, the process 500 proceeds to 508 where the driver determines a value associated with the second input based on the association in the HID remapping table. In some implementations, the driver determines the value using the background process. The driver provides the value to the operating system 320. In some cases, the external input device is an external keyboard, the internal input device is an on-board keyboard, and the value is a scan code tied to an operation or a function.

From 508, the process proceeds to 510 where the operating system 320 performs an operation or a function based on the value. From 510, the process 500 ends.

Example System

Figure 6:
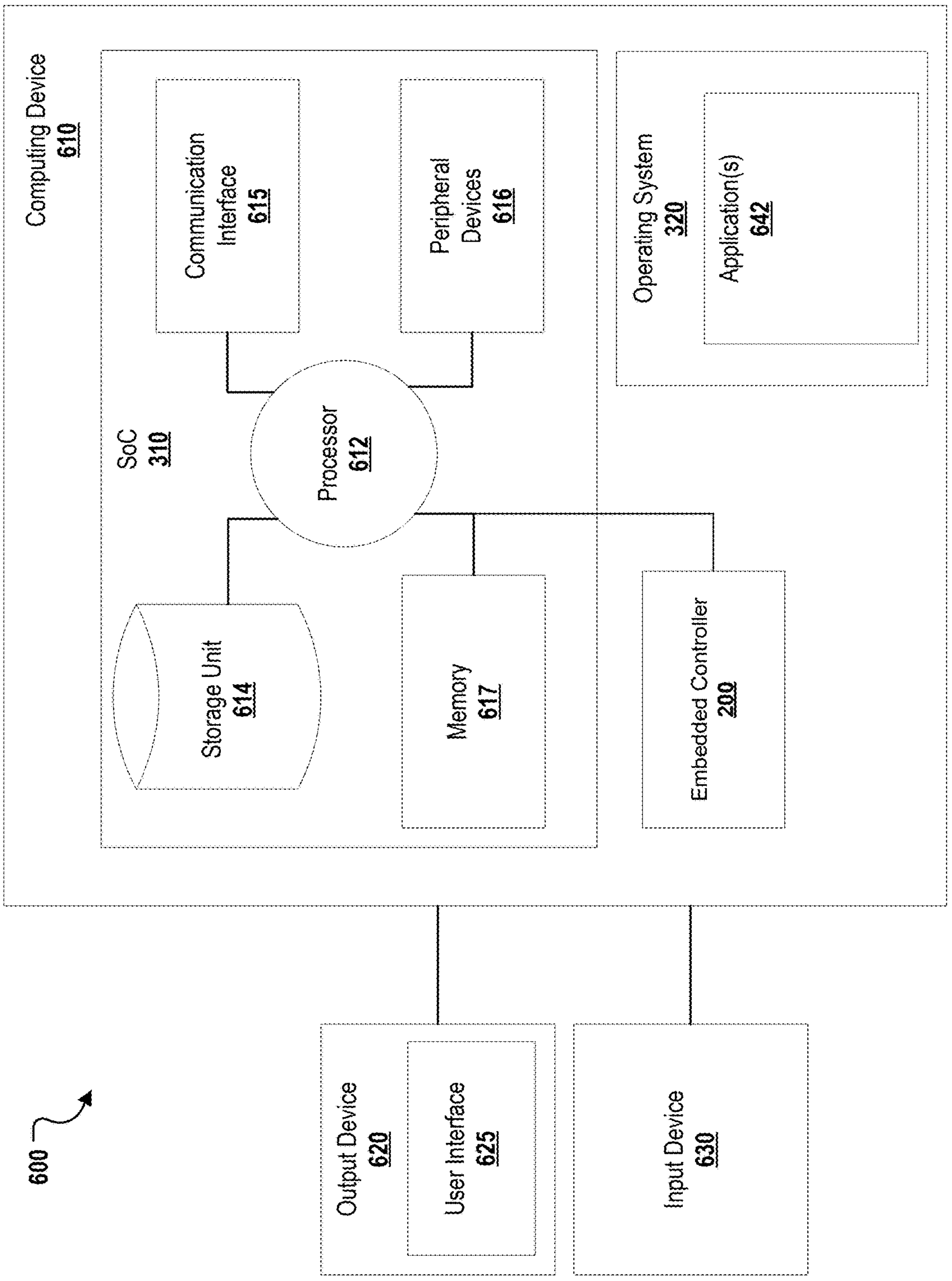
FIG. 6 is an example system that includes a computer or computing device that can be programmed or otherwise configured to implement systems or methods of the present disclosure.

FIG. 6 depicts an example computing system 600 that includes a computer or computing device 610 that can be programmed or otherwise configured to implement systems or methods of the present disclosure. For example, the computing device 610 can be configured as the host device 300 described above with reference to FIGS. 3A and 3B and programmed or otherwise configured to implement the processes 400 and 500 described above with reference to FIGS. 4A, 4B, and 5. In some cases, the computing device 610 includes the operating system 320, described above with reference to FIGS. 3A and 3B and configured to perform executable instructions. The operating system is, for example, software, including programs and data that manages the device's hardware and provides services for execution of applications. As described above, the operating system 320 instantiates applications and drivers 642, which include USB driver 322, HID driver 324, mapper daemon 326, and embedded controller driver 328.

In the depicted implementation, the computer or computing device 610 includes the SoC 310, which may include an electronic processor (also "processor" and "computer processor" herein) 612, such as a central processing unit (CPU) or a graphics processing unit (GPU), which is optionally a single core, a multi core processor, or a plurality of processors for parallel processing. The depicted implementation also includes memory 617 (e.g., random-access memory, read-only memory, flash memory); electronic storage unit 614 (e.g., hard disk or flash); communication interface module 615 (e.g., a network adapter or modem) for communicating with one or more other systems; peripheral devices 616, such as cache, other memory, data storage, microphones, speakers, and the like; and the embedded controller 200, described above with reference to FIGS. 2, 3A, and 3B.

In some implementations, the memory 617, storage unit 614, communication interface module 615 and peripheral devices 616 are in communication with the electronic processor 612 through a communication bus (shown as solid lines), such as a motherboard. In some implementations, the bus of the computing device 610 includes multiple buses. The above-described hardware components of the computing device 610 can be used to facilitate, for example, an operating system and operations of one or more applications executed via the operating system. For example, a reverb characteristic of an environment may be maintained and used to provide audio to a user via a connected audio device. In some implementations, the computing device 610 includes more or fewer components than those illustrated in FIG. 6 and performs functions other than those described herein.

In some implementations, the memory 617 and storage unit 614 include one or more physical apparatuses used to store data or programs on a temporary or permanent basis. In some implementations, the memory 617 is volatile memory and can use power to maintain stored information. In some implementations, the storage unit 614 is non-volatile memory and retains stored information when the computer is not powered. In further implementations, memory 617 or storage unit 614 is a combination of devices such as those disclosed herein. In some implementations, memory 617 or storage unit 614 is distributed across multiple machines such as a network-based memory or memory in multiple machines performing the operations of the computing device 610.

In some cases, the storage unit 614 is a data storage unit or data store for storing data. In some instances, the storage unit 614 stores files, such as drivers, libraries, and saved programs. In some implementations, the storage unit 614 stores data received by the device (e.g., audio data). In some implementations, the computing device 610 includes one or more additional data storage units that are external, such as located on a remote server that is in communication through a network.

In some implementations, platforms, systems, media, and methods as described herein are implemented by way of machine or computer executable code stored on an electronic storage location (e.g., non-transitory computer readable storage media) of the computing device 610, such as, for example, on the memory 617 or the storage unit 614. In further implementations, a computer readable storage medium is optionally removable from a computer. Non-limiting examples of a computer readable storage medium include compact disc read-only memories (CD-ROMs), digital versatile discs (DVDs), flash memory devices, solid state memory, magnetic disk drives, magnetic tape drives, optical disk drives, cloud computing systems and services, and the like. In some cases, the computer executable code is permanently, substantially permanently, semi-permanently, or non-transitorily encoded on the media.

In some implementations, the electronic processor 612 is configured to execute the code. In some implementations, the machine executable or machine-readable code is provided in the form of software. In some examples, during use, the code is executed by the electronic processor 612. In some cases, the code is retrieved from the storage unit 614 and stored on the memory 617 for ready access by the electronic processor 612 and/or the embedded controller 200. In some situations, the storage unit 614 is precluded, and machine-executable instructions are stored on the memory 617. In some implementations, the embedded controller 200 includes or is configured to access a memory and/or a storage unit that are separate from the storage unit 614 and the memory 617. In such cases, the machine-executable instructions executable by the embedded controller 200 may be stored separately from the instructions executable by the electronic processor 612.

In some cases, the electronic processor 612 is a component of a circuit, such as an integrated circuit. One or more other components of the computing device 610 can be optionally included in the circuit. In some cases, the circuit is an application specific integrated circuit (ASIC) or a field programmable gate arrays (FPGAs). In some cases, the operations of the electronic processor 612 can be distributed across multiple machines (where individual machines can have one or more processors) that can be coupled directly or across a network.

In some cases, the computing device 610 is optionally operatively coupled to a communication network via the communication interface module 615, which may include digital signal processing circuitry. Communication interface module 615 may provide for communications under various modes or protocols, such as global system for mobile (GSM) voice calls, short message/messaging service (SMS), enhanced messaging service (EMS), or multimedia messaging service (MMS) messaging, code-division multiple access (CDMA), time division multiple access (TDMA), frequency division multiple access (FDMA), orthogonal frequency-division multiple access (OFDMA), wideband code division multiple access (WCDMA), or general packet radio service (GPRS), among others. Such communication may occur, for example, through a transceiver. In addition, short-range communication may occur, such as using a BLUETOOTH, WI-FI, or other such transceiver.

In some cases, the computing device 610 includes or is in communication with one or more output devices 620. In some cases, the output device 620 includes a display to send visual or audio information to a user. In some cases, the output device 620 is a touch sensitive display that combines a display with a touch sensitive element that is operable to sense touch inputs and functions as both the output device 620 and the input device 630. In still further cases, the output device 620 is a combination of devices such as those disclosed herein. In some cases, the output device 620 displays a user interface 625 that is generated by the computing device 610.

In some cases, the computing device 610 includes or is in communication with one or more input devices 630 that are configured to receive information from a user. In some cases, as described in the examples above, the input device 630 is a keyboard. It is contemplated, however, that the systems and methods described herein can be implemented using any type of input device where a number of inputs may be mapped between a default input device (e.g., embedded in the computing device 610 or external to the computing device 610) and an external device(s) having the same or similar type input functions. By way of non-limiting examples, in some cases, the input device 630 is a keypad (e.g., a telephone-based keypad). In some cases, the input device 630 is a cursor-control device including a mouse, trackball, trackpad, joystick, game controller, or stylus. In some cases, the input device 630 is a touchscreen, a multi-touchscreen (e.g., a screen may project a keyboard that is mapped to the OEM keyboard via the remapping table). In other cases, the input device 630 may include a virtual device projected in a virtual environment (e.g., a virtual keyboard projected into an interactive environment interfaced via the computing device 610, for example, via a screen or worn display device, that is mapped to the OEM keyboard via the remapping table). In still further cases, the input device is a combination of devices such as those disclosed herein.

It should also be noted that a plurality of hardware and software-based devices, as well as a plurality of different structural components, may be used to implement the described examples. In addition, implementations may include hardware, software, and electronic components or modules that, for purposes of discussion, may be illustrated and described as if most of the components were implemented solely in hardware. In some implementations, the electronic-based aspects of the disclosure may be implemented in software (e.g., stored on non-transitory computer-readable medium) executable by one or more processors, such as electronic processor 612 and/or the embedded controller 200. As such, it should be noted that a plurality of hardware and software-based devices, as well as a plurality of different structural components may be employed to implement various implementations.

It should also be understood that although certain drawings illustrate hardware and software located within particular devices, these depictions are for illustrative purposes only. In some implementations, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Moreover, various implementations of the systems and techniques described herein can be realized in digital electronic circuitry, integrated circuitry, specially designed ASICs (application specific integrated circuits), computer hardware, firmware, software, or combinations thereof. These various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include computer readable or machine instructions for a programmable electronic processor and can be implemented in a high-level procedural or object-oriented programming language, or in assembly/machine language. As used herein, the terms "machine-readable medium" and "computer-readable medium" refer to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

The functionality of the computer readable instructions may be combined or distributed as desired in various environments. In some implementations, a computer program includes one sequence of instructions. In some implementations, a computer program includes a plurality of sequences of instructions. In some implementations, a computer program is provided from one location. In other implementations, a computer program is provided from a plurality of locations. In various implementations, a computer program includes one or more software modules. In various implementations, a computer program includes, in part or in whole, one or more web applications, one or more mobile applications, one or more standalone applications, one or more web browser plug-ins, extensions, add-ins, or add-ons, or combinations thereof.

Unless otherwise defined, the technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of implementations of the present disclosure.

A number of implementations have been described. Nevertheless, it will be understood that various modifications may be made without departing from the spirit and scope of the disclosed implementations. While preferred implementations of the present disclosure have been shown and described herein, it will be obvious to those skilled in the art that such implementations are provided by way of example only. Numerous variations, changes, and substitutions will now occur to those skilled in the art without departing from the described system. It should be understood that various alternatives to the implementations described herein may be employed in practicing the described system.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example implementations does not define or constrain this disclosure. Other changes, substitutions, and alterations are also possible without departing from the spirit and scope of this disclosure.

What is claimed is:

1. A method comprising:

detecting, via an embedded controller, a connection with an external input device, the embedded controller communicably coupled to an electronic processor;

retrieving, from the embedded controller via the electronic processor, an association between a first input of the external input device and a second input of an internal input device;

in response to retrieving the association, via the electronic processor:

storing the association to at least one memory address, and instantiating a background process having access to the at least one memory address and configured to access the association;

receiving, via the electronic processor, the first input from the external input device; and in response to receiving the first input from the external input device, determining, via the electronic processor using a driver configured to access the background process, a value associated with the second input based on the association and providing the value to an operating system.

2. The method of claim 1, wherein the association is included in an association table that includes a plurality of associations between a plurality of inputs of the external input device and a plurality of inputs of the internal input device, the plurality of inputs of the external input device includes the first input, and the plurality of inputs of the internal input device includes the second input.

3. The method of claim 1, wherein the external input device is an external keyboard, the internal input device is an on-board keyboard, the value is a scan code tied to an operation or a function, and the method further comprising:

executing, via the operating system, the operation or the function in response to receiving the value.

4. The method of claim 1, wherein the association is retrieved from a memory location accessible by the embedded controller and the electronic processor.

5. A method comprising:

detecting, via an embedded controller, a connection with an external input device, the embedded controller communicably coupled to an electronic processor;

in response to detecting an override condition, providing, via the embedded controller, an override signal to a system on a chip that includes the electronic processor, the override condition including detecting the connection with the external input device;

retrieving, from the embedded controller via the electronic processor, an association between a first input of the external input device and a second input of an internal input device;

receiving, via the electronic processor, the first input from the external input device; and in response to receiving the first input from the external input device, determining, via the electronic processor, a value associated with the second input based on the association and providing the value to an operating system.

6. The method of claim 5, wherein the association is retrieved in response to receiving the override signal.

7. The method of claim 5, wherein the override condition includes detecting the connection with the external input device and detecting that a display lid is in a closed position.

8. The method of claim 5, wherein detecting the connection with the external input device includes receiving, from the system on a chip via a communication protocol, an input signal indicating the connection of the external input device.

9. The method of claim 8, wherein the input signal is provided to a pin of the embedded controller.

10. The method of claim 5, further comprising: in response to retrieving the association between the first input of the external input device and the second input of the internal input device:

storing, via the electronic processor, the association to at least one memory address; and instantiating, via the electronic processor, a background process having access to the at least one memory address and configured to access the association, wherein the value is determined via a driver configured to access the background process.

11. A system comprising:

an internal input device;

an external input device;

an embedded controller configured to detect a connection with the external input device; and an electronic processor communicably coupled to the embedded controller and configured to:

retrieve, from the embedded controller, an association between a first input of the external input device and a second input of the internal input device;

in response to retrieving the association, store the association to at least one memory address and instantiate a background process having access to the at least one memory address;

receive the first input from the external input device; and in response to receiving the first input from the external input device determine, via the background process, a value associated with the second input based on the association, and provide the value to an operating system.

12. The system of claim 11, wherein the association is included in an association table that includes a plurality of associations between a plurality of inputs of the external input device and a plurality of inputs of the internal input device, the plurality of inputs of the external input device includes the first input, and the plurality of inputs of the internal input device include the second input.

13. The system of claim 11, wherein the external input device is an external keyboard, the internal input device is an on-board keyboard, the value is a scan code tied to an operation or a function, and the electronic processor is further configured to execute, via the operating system, the operation or the function in response to receiving the first input from the external input device.

14. The system of claim 11, wherein the association is retrieved from a memory location accessible by the embedded controller and the electronic processor.

15. The system of claim 11, further comprising a system on a chip that includes the electronic processor, wherein the embedded controller is further configured to, in response to detecting an override condition, provide an override signal to the system on a chip, and the override condition includes detecting the connection with the external input device.

16. A system comprising:
an internal input device;
an external input device;
an embedded controller; and
a system on a chip that includes an electronic processor communicably coupled to the embedded controller,
wherein the embedded controller is configured to:
detect a connection with the external input device, and
in response to detecting an override condition, provide an override signal to the system on a chip,
the override condition includes detecting the connection with the external input device, and
the electronic processor is configured to:
retrieve, from the embedded controller, an association between a first input of the external input device and a second input of the internal input device;
receive the first input from the external input device; and
in response to receiving the first input from the external input device, determine a value associated with the second input based on the association and provide the value to an operating system.

17. The system of claim 16, wherein the association is retrieved in response to receiving the override signal.

18. The system of claim 16, further comprising a display lid, wherein the override condition includes detecting the connection with the external input device and detecting that the display lid is in a closed position.

19. The system of claim 16, wherein detecting the connection with the external input device includes receiving, from the system on a chip via a communication protocol, an input signal indicating the connection of the external input device.

20. The system of claim 19, wherein the input signal is provided to a pin of the embedded controller.

* * * * *